United States Patent
Kim et al.

(10) Patent No.: US 8,117,374 B2
(45) Date of Patent: Feb. 14, 2012

(54) FLASH MEMORY CONTROL DEVICES THAT SUPPORT MULTIPLE MEMORY MAPPING SCHEMES AND METHODS OF OPERATING SAME

(75) Inventors: Jin-Hyuk Kim, Seoul (KR); Young-Joon Choi, Gyeonggi-do (KR); Chan-Ik Park, Seoul (KR)

(73) Assignee: Samsung Electronics Co., Ltd. (KR)

(*) Notice: Subject to any disclaimer, the term of this patent is extended or adjusted under 35 U.S.C. 154(b) by 964 days.

(21) Appl. No.: 11/289,175

(22) Filed: Nov. 29, 2005

(65) Prior Publication Data
US 2006/0179212 A1 Aug. 10, 2006

(30) Foreign Application Priority Data
Feb. 7, 2005 (KR) .................. 10-2005-0011300

(51) Int. Cl.
*G06F 12/00* (2006.01)
(52) U.S. Cl. ........ 711/103; 711/100; 711/102; 711/156; 711/200; 711/202; 711/203
(58) Field of Classification Search .................. 711/100, 711/102–103, 115, 156, 202–203
See application file for complete search history.

(56) References Cited

U.S. PATENT DOCUMENTS

| | | | |
|---|---|---|---|
| 5,408,082 A | 4/1995 | Takagi et al. | |
| 5,832,522 A | 11/1998 | Blickenstaff et al. | |
| 5,963,983 A * | 10/1999 | Sakakura et al. | 711/202 |
| 6,014,724 A * | 1/2000 | Jenett | 711/103 |
| 7,085,879 B2 * | 8/2006 | Aasheim et al. | 711/103 |
| 7,139,883 B2 * | 11/2006 | Aasheim et al. | 711/156 |
| 7,287,117 B2 * | 10/2007 | Chung et al. | 711/103 |
| 7,356,667 B2 * | 4/2008 | Harris et al. | 711/206 |
| 7,529,880 B2 * | 5/2009 | Chung et al. | 711/103 |
| 2001/0012222 A1 * | 8/2001 | Terasaki | 365/200 |
| 2003/0097520 A1 | 5/2003 | Lai et al. | |
| 2004/0186946 A1 * | 9/2004 | Lee | 711/103 |
| 2007/0097520 A1 | 5/2007 | Miyazaki et al. | |

FOREIGN PATENT DOCUMENTS

| | | |
|---|---|---|
| JP | 2000-305839 | 11/2000 |
| JP | 2001-244997 | 9/2001 |
| JP | 2002-073409 | 3/2002 |
| JP | 2004-508626 | 3/2004 |
| JP | 2004-208246 | 7/2004 |
| KR | 1994-0004469 A | 3/1994 |

(Continued)

OTHER PUBLICATIONS

Notice to File a Response/Amendment to the Examination Report, Korean Application No. 2005-11300, May 24, 2006.

*Primary Examiner* — Tuan Thai
*Assistant Examiner* — Zhou Li
(74) *Attorney, Agent, or Firm* — Myers Bigel Sibley & Sajovec, P.A.

(57) ABSTRACT

There is provided an apparatus for controlling a flash memory, which includes a memory for storing a plurality of flash translation layers; and a control block for, when an access is requested from outside, determining a pattern of the access, selecting one of the flash translation layers stored in the memory based on the determination result, and managing mapping data of the flash memory based on the selected flash translation layer.

34 Claims, 9 Drawing Sheets

FOREIGN PATENT DOCUMENTS

| | | |
|---|---|---|
| KR | 1020020092261 A | 12/2002 |
| KR | 1020020092487 A | 12/2002 |
| KR | 1020040009926 A | 1/2004 |
| KR | 2004-82921 A | 9/2004 |
| KR | 2006-7667 | 1/2006 |
| WO | WO 02/19334 A2 | 3/2002 |

* cited by examiner

Fig. 2A (PRIOR ART)

```
        PBN0                        PBN1
PPN            LPN          PPN            LPN
 0   ╳╳╳╳╳╳╳    0           10   ╳╳╳╳╳╳╳    0
 1   ╳╳╳╳╳╳╳    1           11              1
 2              2           12              2
 3              1           13              3
 4              0           14              0
 5              3           15
```

Fig. 2B (PRIOR ART)

<Before Merging>

| PPN | LPN |
|-----|-----|
| 0   | 0   |
| 1   | 1   |
| 2   | 2   |
| 3   | 1   |
| 4   | 0   |
| 5   | 3   |

<After Merging>

| LPN | PPN |
|-----|-----|
| 0   | 14  |
| 1   | 11  |
| 2   | 12  |
| 3   | 13  |
| 4   | NA  |
| 5   | NA  |

(NA : Not Allocated)

FLASH MEMORY CONTROL DEVICES THAT SUPPORT MULTIPLE MEMORY MAPPING SCHEMES AND METHODS OF OPERATING SAME

REFERENCE TO PRIORITY APPLICATION

This application claims priority to Korean Patent Application No. 10-2005-0011300, filed Feb. 7, 2005, the disclosure of which is hereby incorporated herein by reference.

FIELD OF THE INVENTION

The present invention relates to data storage devices and, more particularly, to flash memory devices and methods of operating flash memory devices.

BACKGROUND OF THE INVENTION

Diverse forms of personal computers, such as desktop computers for office and laptop computers for a mobile environment have been developed for commercial and personal use. A computer system may include a main memory and an external storage device. The external storage device may have a large memory capacity and a low unit price. External storage devices include a conventional hard disk drive (HDD) and a floppy disk drive (FDD) used in a disk storing medium. Generally, disk storage provides a large memory capacity at a low price, but may require delicate mechanical techniques to perform various operations, (e.g., disk searching), with a magnetic head. Thus, the disk storage may be damaged by physical impact, which makes it less reliable than other kinds of memory devices. External semiconductor memory devices adopting a flash memory, such as flash Electrically Erasable Programmable Read-Only Memory (EEPROM), provide an executable alternative to disk storage in an arbitrary environment. Flash memory devices are non-volatile memory devices that are programmable more than once. Moreover, flash memory devices have relatively simple structures that can be realized at low cost. Because a flash memory device may consume a low level of power and is compact, light, and less fragile to physical impact, the flash memory devices are frequently suitable for a mobile environment. One drawback to using a flash memory device includes the requirement that an erasure operation should be performed before a program operation. Another drawback includes the requirement of using high voltages (e.g., 12V or 20V) to perform erasure operations.

A host processor may access an external storage device by generating a logical address. The logical address refers to an arbitrary location in a logical memory space recognized by host software, (i.e., an operating system or an application). A logical address is transformed into a physical address corresponding to a physical memory space of an external storage device. Generally, an external storage device using flash memory requires additional software called disk emulation software to secure compatibility with the host during an access operation. The compatibility between the host and the external flash storage device can be achieved by operating a conventional file system such as a flash translation layer (FTL). In this case, the host processor recognizes the external flash storage device as an HDD/SDRAM and accesses the external flash memory device in the same manner as it accesses an HDD/SDRAM. The FTL connects a flash memory card to a file system used in a particular operating system and it does not allow writing more than once to the same address without prior erasure.

The FTL functions include management of logical address-physical address mapping, management of bad blocks, management of data preservation against unexpected power cutoff, and management of abrasion. The core function among the FTL functions involves address mapping. Exemplary address mapping schemes are presented in U.S. Pat. No. 5,404,485 entitled "Flash file system"; U.S. Pat. No. 5,937,425 entitled "Flash file system optimized for page-mode flash technologies"; and U.S. Pat. No. 6,381,176 entitled "Method of driving remapping in flash memory and flash memory architecture suitable therefore," the disclosures of which are hereby incorporated herein by reference.

In the case where a flash memory is accessed on a block basis, the flash memory is divided into a plurality of blocks. A number called a physical block number is allocated to each of the blocks sequentially, and a virtual number for a block a user thinks is being used in called a logical block number. A method for mapping the logical block number to a physical block number includes (ii) a block mapping scheme, (iii) a sector (or page) mapping scheme, and (iii) a log mapping scheme. In an FTL using a mapping scheme, data having logically consecutive addresses can be registered in physically different locations. Since a flash memory has a larger erasion unit than a writing unit or a program unit, when writing into different physical locations reaches a predetermined level, it is necessary to collect consecutive data dispersed in physically different locations into the same address space by using a free block. This operation is called merging.

Merging operations using the aforementioned block mapping scheme, sector mapping scheme, and log mapping scheme will now be described in detail. Prior to the description on the merging operations, it is assumed herein that a flash memory is divided into a plurality of memory blocks and each memory block is formed of a plurality of pages or sectors. A reference 'PBN' stands for a physical block number and a reference 'PPN' denotes a physical page number, while a reference 'LPN' stands for a logical page number.

Block Mapping Scheme

Merging operation using a block mapping scheme will be described herein with reference to FIG. 1. According to the block mapping scheme, when data is stored in an arbitrary memory block, it is stored consecutively in the pages of the memory block. For example, when data is updated or re-registered in the $i^{th}$ page (i.e., PPNi), of a memory block having a physical block number of '2,' (i.e., PBN2), data stored in the other pages except the $i^{th}$ page PPNi, for which the update is requested, are copied into corresponding pages of an empty block, which is called a free memory block (e.g., PBN3). Then, the data to be stored in the page PPNi of the memory block PBN2 is updated/re-registered into the corresponding $i^{th}$ page of the memory block PBN3. Subsequently, the entire memory block PBN2 is erased and becomes a free memory block. In the block mapping scheme, a merging operation should be carried out whenever new data is updated into a page containing old data. Block mapping of data between a physical block number and a logical block number is typically managed using a block mapping table.

Sector (Page) Mapping Scheme

A merging operation using a sector mapping scheme will be described herein with reference to FIGS. 2A and 2B. According to the page (or sector) mapping scheme, data is written into pages of a memory block sequentially. Herein, a page has the same size as a sector, but it is obvious to those of ordinary skill in the art that one page can be formed of a plurality of sectors. For example, data in a logical page LPN0 is stored in a physical page PPN0, and data in a logical page LPN1 is stored in a physical page PPN1. Data in a logical page LPN2 is stored in a physical page PPN2. When first data is to be updated into a logical page LPN1, this first data is stored in a physical page PPN3 and the physical page PPN1 is updated so that it stores null data, which is marked as 'X' in FIG. 2A. In addition, when data is to be updated into a logical page LPN0, the second data is stored in a physical page PPN4 and the physical page PPN0 is updated so that it stores null data, which is marked as 'X' in FIG. 2A. If writing is carried out with respect to all pages, that is, if there is no free page in the memory block PBN0, the merging operation is performed when the writing into the memory block PBN0 is requested. As shown in FIG. 2A, only valid data of the memory block PBN0 (i.e., physical pages PPN2 to PPN5), is copied into corresponding pages PPN10 to PPN13 of a free memory block PBN1. Then, the data of a logical page LPN0 in the memory block PPBN1, for which the writing operation is requested, is stored in a physical page PPN14 of the free memory block PBN1. The physical page PPN0 of the memory block PBN1 will then be processed so that it stores null data, which is marked as 'X' in FIG. 2A. Subsequently, the physical memory block PBN10 will be erased. A mapping table is modified as shown in FIG. 2B and the modified mapping table is managed by a flash translation layer (FTL).

Log Mapping Scheme

Merging operation using a log mapping scheme will be described herein in detail with reference to FIGS. 3A to 3C. According to the log mapping scheme, as shown in FIG. 3A, memory blocks are divided into a data region, a log region, and a meta region, and a table of the mapping data is managed by an FTL. In the log mapping scheme, some memory blocks of the data region are designated as the memory blocks of a log region. For example, it is assumed that a flash memory includes 9 memory blocks PBN0 to PNB8. When the memory blocks are not yet used, memory blocks PBN0 to PBN4 are defined as the data region, and memory blocks PBN5 to PBN7, are defined as the log region, and a memory block PBN8 is defined as the meta region, individually. Herein, the memory blocks PBN0 and PBN2 of the data region are designated as the memory blocks PBN5 and PBN6 of the log region, and a memory block PBN7 of the log region is designated as a free memory block. Mapping data between memory blocks, mapping data between the memory region and the log region, and mapping data of the log region are managed in a block mapping table, a log block mapping table, and a log mapping table, respectively. Each memory block is formed of a plurality of pages or a plurality of sectors.

When data is to be written into a memory block PBN0, the data is not written into the memory block PBN0 directly but is stored in a memory block PBN5 of the log region, which corresponds to the memory block PBN0. For example, when data corresponding to a logical page LPN2 is to be written into a memory block PBN0, the data is written into a physical page PBN0 of the memory block PBN5 of the log region. Likewise, when data corresponding to a logical page LPN0 is to be written into the memory block PBN0, the data is written into a physical page PBN1 of the memory block PBN5 of the log region. When data is to be written into the memory block PBN1, merging is carried out as follows because a memory block of the log region corresponding to the memory block PBN1 is designated. First, it is determined whether there is a free memory block in the log region or the data region. If there is a free memory block in the log region, as illustrated in FIG. 3B, valid data stored in any one memory block, for example, a memory block PBN5 among the memory blocks PBN5 and PBN6 of the log region, is copied into a free memory block PBN7. Then, valid data stored in the memory block PBN0 of the data region, which corresponds to the memory block PBN5, is copied/transferred into the memory block PBN7. The copying process is shown in FIG. 3B. After the memory blocks PBN0 and PBN5 are erased, as shown in FIG. 3C, the memory block PBN5 of the log region is designated as the free memory block, and the memory block PBN0 of the data region is designated as a memory block of the log region, while the memory block PBN7 is designated to a memory block of the data region. Finally, the data to be written into the memory block PBN1 is written into the memory block PBN0 of the log region. The mapping data of the block mapping table, the log block mapping table, and the log mapping table are managed by an FTL and they are stored in the meta region PBN8.

Because the page mapping scheme manages the mapping data on a page basis, there is a shortcoming because it typically requires a large mapping table while there is an advantage because it can write small quantities of data easily. The log mapping scheme has a disadvantage in that the merging should be carried out whenever a small quantity of data is written into different data blocks, while it has an advantage in that it can write a large quantity of data easily. Also, the log mapping scheme has an advantage in that it has a relatively small mapping table compared to the page mapping scheme.

Generally, a flash memory system having a flash memory as a storage medium manages the flash memory using a single FTL. Flash memories have diverse access patterns: a pattern where part of contents stored in a memory block are updated and a pattern where free memory blocks are all used for new contents. However, since different access patterns are processed by only a single FTL, the performance of the entire system can be degraded.

SUMMARY OF THE INVENTION

Embodiments of the invention include an apparatus for controlling a flash memory. This apparatus includes a memory for storing a plurality of flash translation layers and a control block for, when an external access is requested, determining a pattern of the access, selecting one of the flash translation layers stored in the memory based on the determination result, and managing mapping data of the flash memory based on the selected flash translation layer. The control block (unit) may extract logical address information from data inputted when the access is requested and determine the pattern of access based on the extracted logical address information. In addition, the control block may accumulate the access pattern information whenever an access is requested, and determine the access pattern of the flash memory based on the accumulated access pattern information. The control block may also determine the access pattern based on access information inputted from outside when the access is requested. The flash memory may also include a plurality of memory regions corresponding to the flash translation layers individually, and mapping data of each memory region may be managed by a corresponding flash translation layer. The flash memory may be divided into at least a first memory region and a second memory region, and the memory includes a first flash translation layer for managing mapping data of the first memory region and a second flash translation layer for managing mapping data of the second memory region.

The first flash translation layer may use a page mapping scheme, and the second flash translation layer may use any one of log and block mapping schemes. The flash memory and the apparatus for controlling the flash memory may be included in a memory card. Alternatively, the apparatus for controlling the flash memory may be included in a semiconductor solid state disk controller.

In another aspect of the present invention, there is provided a flash memory system, which includes a host, a flash memory including a plurality of memory regions and a control device storing at least two flash translation layers, wherein whenever an access is requested from the host, the control device determines a pattern of the access based on access information provided from the host, selects one of the flash translation layers based on the determined access pattern, and manages mapping data for the memory regions in the flash memory based on the selected flash translation layer. The control device may include a memory for storing the flash translation layers and a control block for determining the pattern of the access based on the access information, selecting one of the flash translation layers based on the determined access pattern, and managing mapping data for the memory regions of the flash memory based on the selected flash translation layer.

Additional embodiments of the invention include a method for managing mapping data of a flash memory. This method includes the steps of a) whenever an access to the flash memory is requested, determining a pattern of the access b) selecting one of multiple flash translation layers based on the determined access pattern; and c) managing mapping data of the flash memory based on the selected flash translation layer.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1 to 3C are diagrams illustrating general mapping schemes;

DETAILED DESCRIPTION OF THE INVENTION

Figure 1:
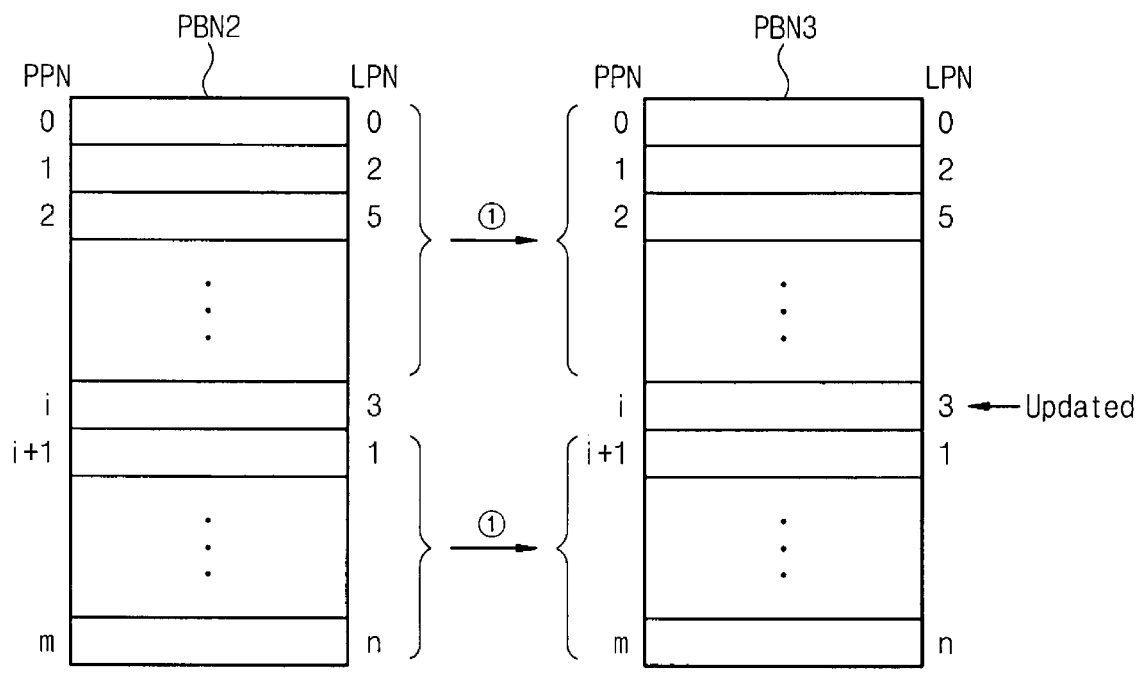
Figures 3A, 3B:
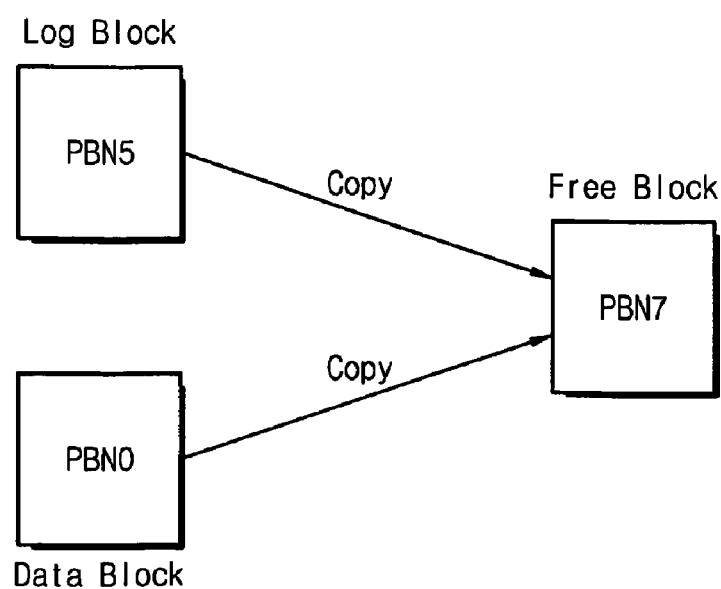
Figure 3C:
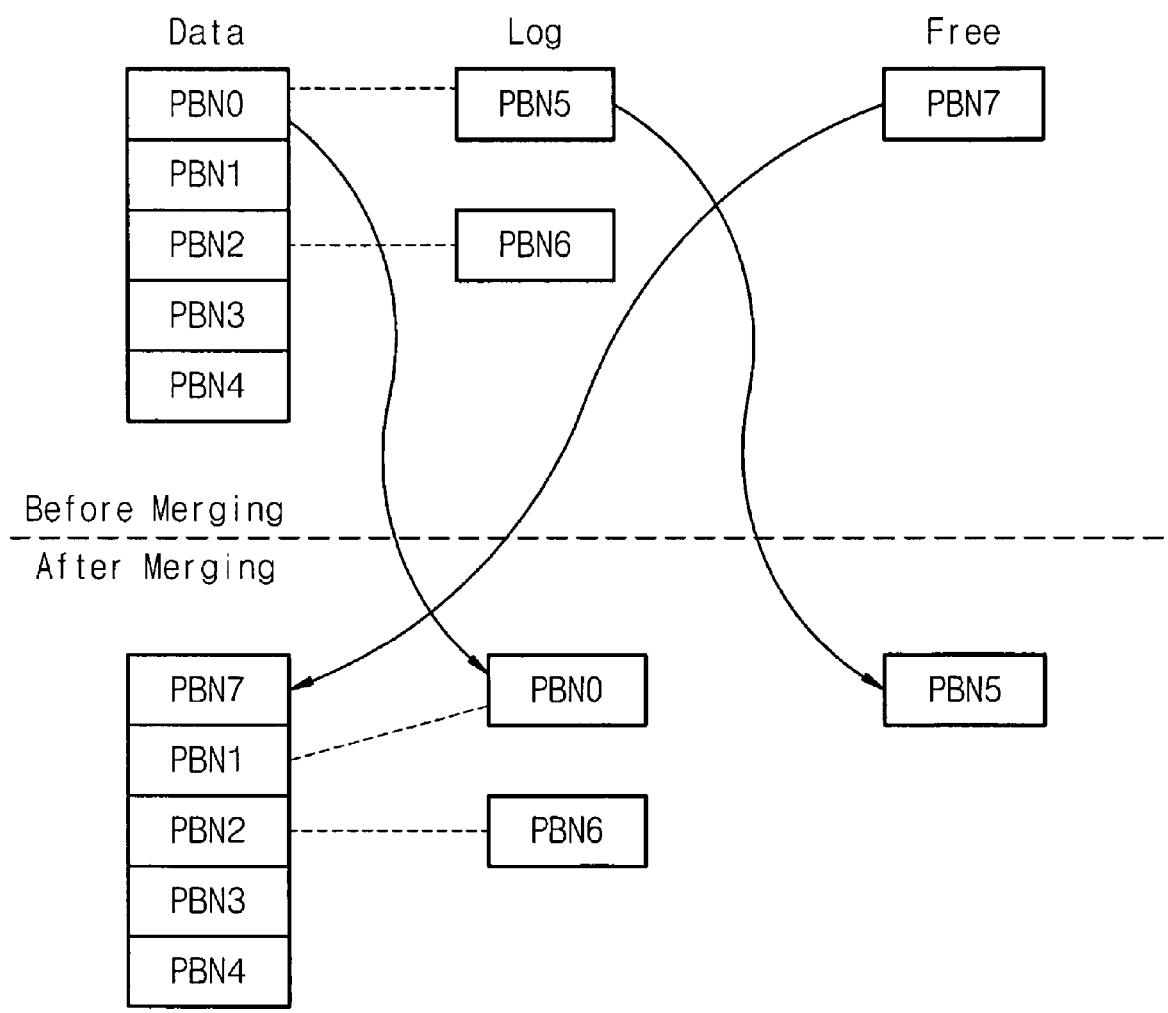

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals.

Figure 4:
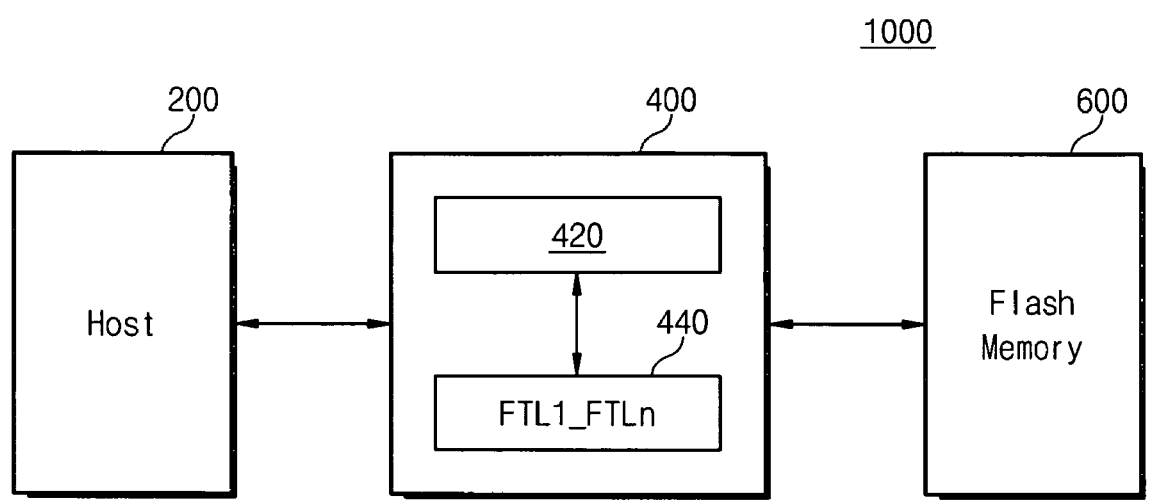
FIG. 4 is a block diagram describing a flash memory system in accordance with embodiments of the present invention.

FIG. 4 is a block diagram illustrating a flash memory system 1000 in accordance with an embodiment of the present invention. Referring to FIG. 4, the flash memory system 1000 according to the present embodiment includes a host processor 200, a control device 400, and a flash memory 600. The control device 400 is configured to control the flash memory 600 upon an access request from the host processor 200. The control device 400 is configured to store a plurality of flash translation layers FTL1 to FTLn, and it determines whether the access request from the host processor 200 is directed to a region of the flash memory 600. The control device 400 selects one of the flash translation layers according to the determination result, and it manages mapping data to the flash memory 600 based on the selected flash translation layer.

In other words, the flash memory system 1000 of the present invention does not manage the flash memory 600 by using only a single flash translation layer. Instead, the flash memory system 1000 manages the flash memory 600 using at least two flash translation layers. Therefore, whenever there is an access request from the host processor 200, the flash memory system 1000 of the present invention selects a flash translation layer appropriate for the access request and then manages the flash memory 600 in an efficient manner based on the access pattern.

As illustrated in FIG. 4, the control device 400 includes a control unit 420 and a memory unit 440. The memory unit 440 stores different flash translation layers, and the control unit 420 determines what pattern of access is requested from the host 200 and selects any one of the flash translation layers FTL1 to FTLn stored in the memory 440 based on the determination result. This process is carried out whenever an access to the flash memory 600 is requested by the host processor 200. To take an example, it is assumed that flash translation layers using a block mapping scheme, a page mapping scheme, and a log mapping scheme are stored in the memory unit 440. As previously described, the page mapping scheme is useful when a small quantity of data is to be written, but it has a shortcoming in that it requires a relatively large mapping table when a large quantity of data is to be written. In contrast, the log mapping scheme is useful when a large quantity of data is to be written, but it has a shortcoming in that merging is performed frequently when a small quantity of data is to be written. But, with the control device 400, it is possible to prevent the performance of the entire system from degrading by using a flash translation layer suitable for each request, (e.g., a random single write request) (for small quantities of data) and a sequential write request (for large quantities of data).

The control device 400 of the present invention can determine the access pattern in multiple ways. First, the access pattern can be determined from access information received from the host processor 200. When a file allocation table (FAT) file system is used, generally, a large quantity of file data is transmitted to the control device 400 as a sequential write request, while update data for FAT is transmitted to the control device 400 as a random single write request. Since the FAT data is stored in a particular region of the flash memory

600, the access pattern can be known by determining whether the current access request is for write operation of the FAT data.

In case of an xD card, the data to be written includes logical address information. Thus, the access pattern can be figured out by extracting the logical address information from the incoming data received from the host processor. If the extracted logical address information is an address for storing the FAT data, the current access request is determined as a random single write request. Otherwise, if the extracted logical address information is not an address for storing the FAT data, the current access request is determined as a sequential write request.

Differently from the previous determination method, it is also possible to apply the most suitable flash translation layer by accumulating access patterns whenever there is an access request. For instance, it is possible to accumulate information on whether there are frequent random single write requests or whether there are frequent sequential write requests for an arbitrary region, and select a flash translation layer based on the accumulated information. Also, it is possible to select a flash translation layer based on information provided from the outside (e.g., information on the pattern of the current access).

Figure 5A:
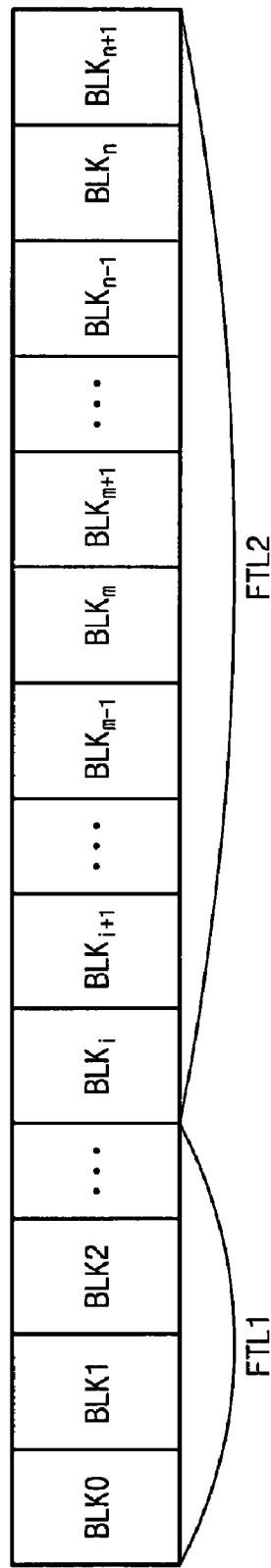
FIGS. 5A and 5B are diagrams describing flash translation layers of memory regions according to a mapping policy of the present invention.
Figure 5B:
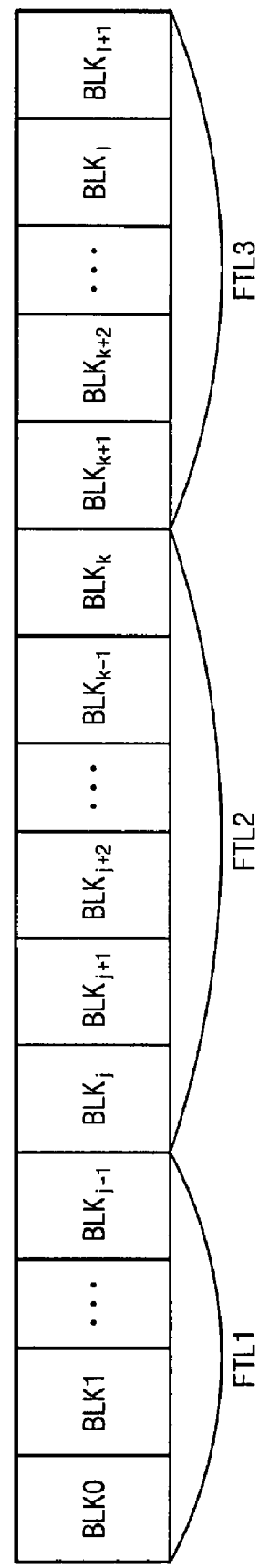

It is assumed that the flash memory 600 includes a plurality of memory blocks and the memory blocks are divided into at least first memory region and a second memory region. It is also assumed that data is stored in the first memory region upon a random single write request, and data is stored in the second memory region upon a sequential write request. According to these assumptions, as shown in FIG. 5A, mapping data of the first memory region can be managed by a first flash translation layer FTL1, while mapping data of the second memory region can be managed by a second flash translation layer FTL2. The first and second flash translation layers FTL1 and FTL2 follow different mapping schemes. To take an example, the first flash translation layer FTL1 follows the page mapping scheme and the second flash translation layer FTL2 follows the log mapping scheme, or vice versa. Moreover, the flash memory 600 can be divided into three or more memory regions and, as shown in FIG. 5B, each memory region can be managed by a flash translation layer of a different mapping policy.

Figure 6:
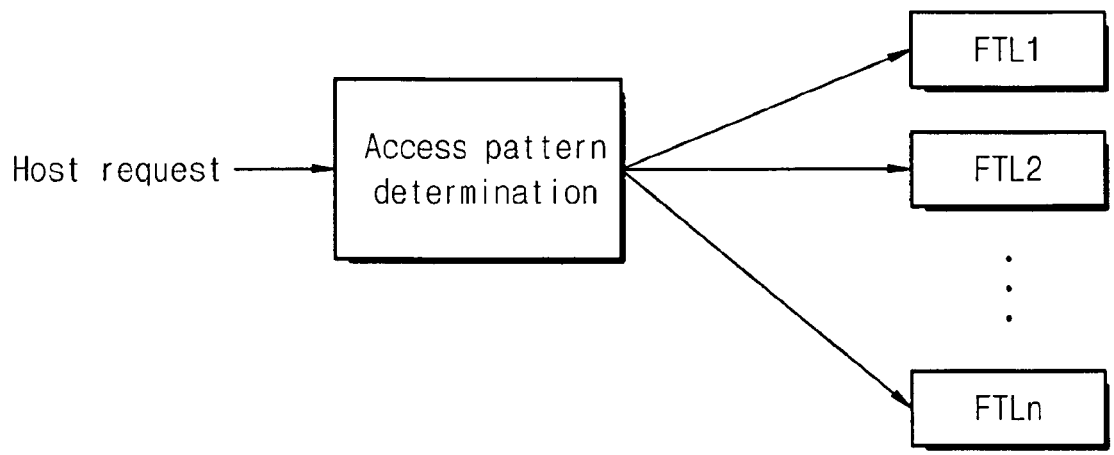
FIG. 6 is a diagram showing a determination process of a control device shown in FIG. 4 upon an access request from a host.

Consequently, as shown in FIG. 6, when there is an access request from the host processor 200, the control device 400 determines the access pattern and selects an appropriate flash translation layer according to the determination result. The mapping data of the flash memory is then managed by the selected flash translation layer.

Figure 7:
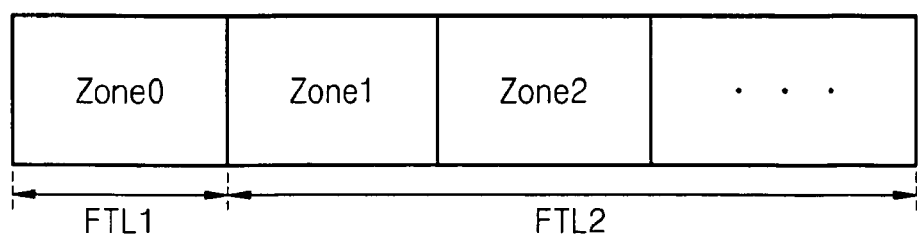
FIG. 7 is a diagram illustrating flash translation layers of memory regions when the mapping policy adopting two flash translation layers is applied to an xD card in accordance with an embodiment of the present invention.

FIG. 7 is an exemplary diagram illustrating an array architecture of a flash memory included in an xD card in accordance with an embodiment of the present invention. In case of an xD memory card, an array of the flash memory includes a plurality of zones Zone0, Zone1, Zone2, . . . ZoneN. Each zone is formed of a plurality of memory blocks. The xD card uses a smart media file system (SMFS) which supports a block write operation. In short, the host processor performs writing on a block basis. In the xD card, an FAT file system is defined based on capacity, and the FAT should be placed in the first zone Zone0 which is formed of a total of 1,024 memory blocks. Thus, the FAT data is always transferred only to within the first zone Zone0. When new data is written into the card, not all the data of the FAT table is updated but only part of the data in the FAT is updated. For example, although FAT data is stored in at least one memory block, changed data is updated only in part of the memory block. On the contrary, picture data is stored in the xD card on a block basis. In other words, when picture data is inputted, the inputted picture data is written into the entire memory block.

In the xD card to which the mapping policy of the present invention is applied, as illustrated in FIG. 7, a first flash translation layer FTL1 is applied to the first zone Zone0, while a second flash translation layer FTL2 (e.g., a flash translation layer adopting the log mapping scheme), which is different from the first flash translation layer FTL1 (e.g., a flash translation layer adopting the page mapping scheme), is applied to the other zones. As described above, since not all the FAT data is updated but only part of the data is updated, it is useful to manage mapping data of the first zone Zone0 by applying the flash translation layer using the page mapping scheme to the first zone Zone0. This is because the changed contents of the FAT are updated in free page(s) of the same memory block in the page mapping scheme without merging. If all pages of an arbitrary block are used, only valid data is copied to a new memory block and the changed contents of the FAT are updated in the free page(s) of the same memory block (i.e., the newly designated memory block). Herein, the copied data is the most recently updated data.

On the contrary, a flash translation layer adopting a log/block mapping scheme is applied to the other zones. This is because, when picture data is inputted, only the mapping table is updated to designate a log block, a memory block of the log region where data is written, as a data block without merging after the inputted data is written in the log block. It is obvious to those skilled in the art that the flash translation layer using the block mapping scheme instead of the log mapping scheme can be applied to the other zones Zone1, Zone2, . . . ZoneN except the first zone Zone0. In this case, since the writing is carried out on a block basis, the inputted picture data is written in a memory block(s) of a corresponding zone sequentially. Likewise, when new picture data is written, only the block mapping table is updated without merging.

Figure 8:
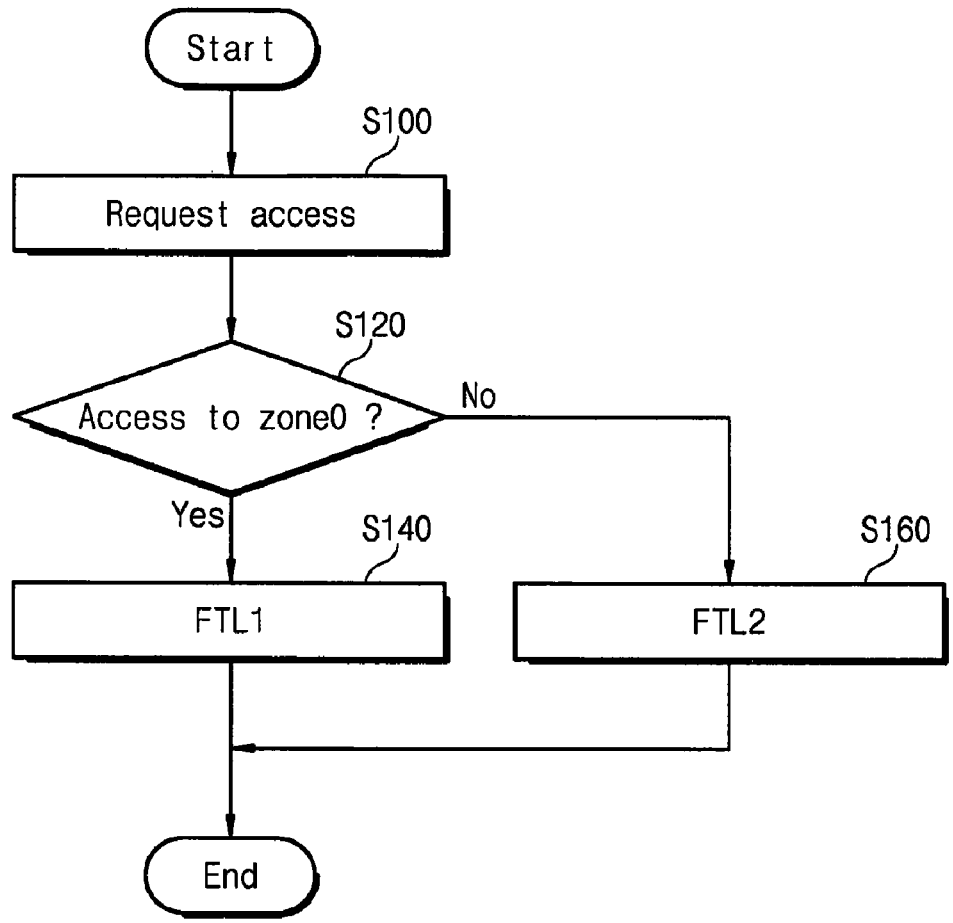
FIG. 8 is a flowchart describing a process of determining a flash translation layer according to the mapping policy of FIG. 7.

Referring to FIG. 8, which is a flowchart describing a process of managing the flash memory of the flash memory system adopting the mapping policy of FIG. 7, first, at step S100, an access to the flash memory 600 is requested from the host processor 200. At step S120, the control device 400 determines the pattern of the currently requested access. For the sake of convenience in description, it is assumed that the first flash translation layer FTL1 uses the page mapping scheme, while the second flash translation layer FTL2 uses the log mapping scheme. Also, it is assumed that the control device 400 uses any one of the aforementioned determination methods, for example, a method of determining the access pattern based on logical address information included in the data to be written. Therefore, the control device 400 extracts the logical address information from the data inputted when an access is requested and determines whether the extracted logical address information is for designating the FAT data. In short, it is determined whether the currently requested access is an access to the first zone Zone0. If the currently requested access is an access to the first zone Zone0, at step S140, the control device 400 manages the mapping data of the flash memory 600 based on the first flash translation layer FTL1 stored in the memory unit 440. If the currently requested access is not an access to the first zone Zone0, at step S160, the control device 400 manages the mapping data of the flash memory 600 based on the second flash translation layer FTL2 stored in the memory unit 440. The aforementioned steps S120 to S160 are repeated whenever an access is requested by the host processor 200.

As described above, since only the most recent data is valid in the FAT, the number of valid pages to be copied during merging is decreased to a number as small as the FAT region. This signifies that not only the frequency number of merging operation but also the time for merging can be saved. Therefore, the performance of the entire system can be prevented from degrading by managing the FAT of the first zone Zone0 using the page mapping scheme.

Figure 9:
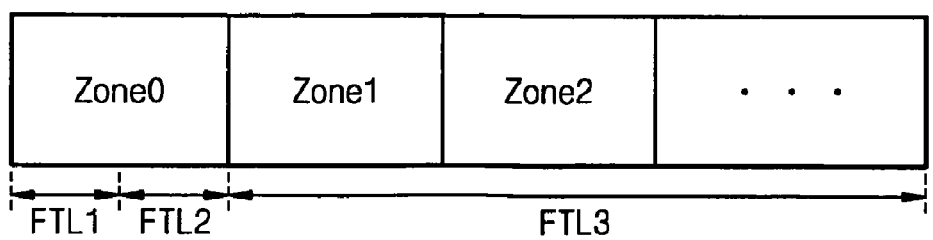
FIG. 9 is a diagram illustrating flash translation layers of memory regions when the mapping policy adopting two flash translation layers is applied to an xD card in accordance with an embodiment of the present invention.

Differently from the mapping policy of FIG. 7, not only one mapping scheme but also two mapping schemes can be applied to the first zone Zone0 storing the FAT data. For example, as shown in FIG. 9, a flash translation layer FTL1 using the page mapping scheme is applied to a first region of the first zone Zone0, while a flash translation layer FTL2 using the block or log mapping scheme is applied to a second region of the first zone Zone0. To the other zones Zone1, Zone2, . . . , ZonN, a flash translation layer FTL3 using a mapping scheme the same as or different from the second region of the first zone Zone0 (i.e., any one of the block, log, and page mapping schemes) is applied. In the first region of the first zone, the FAT data is stored and, in the second region and the other zones, picture data are stored.

Figure 10:
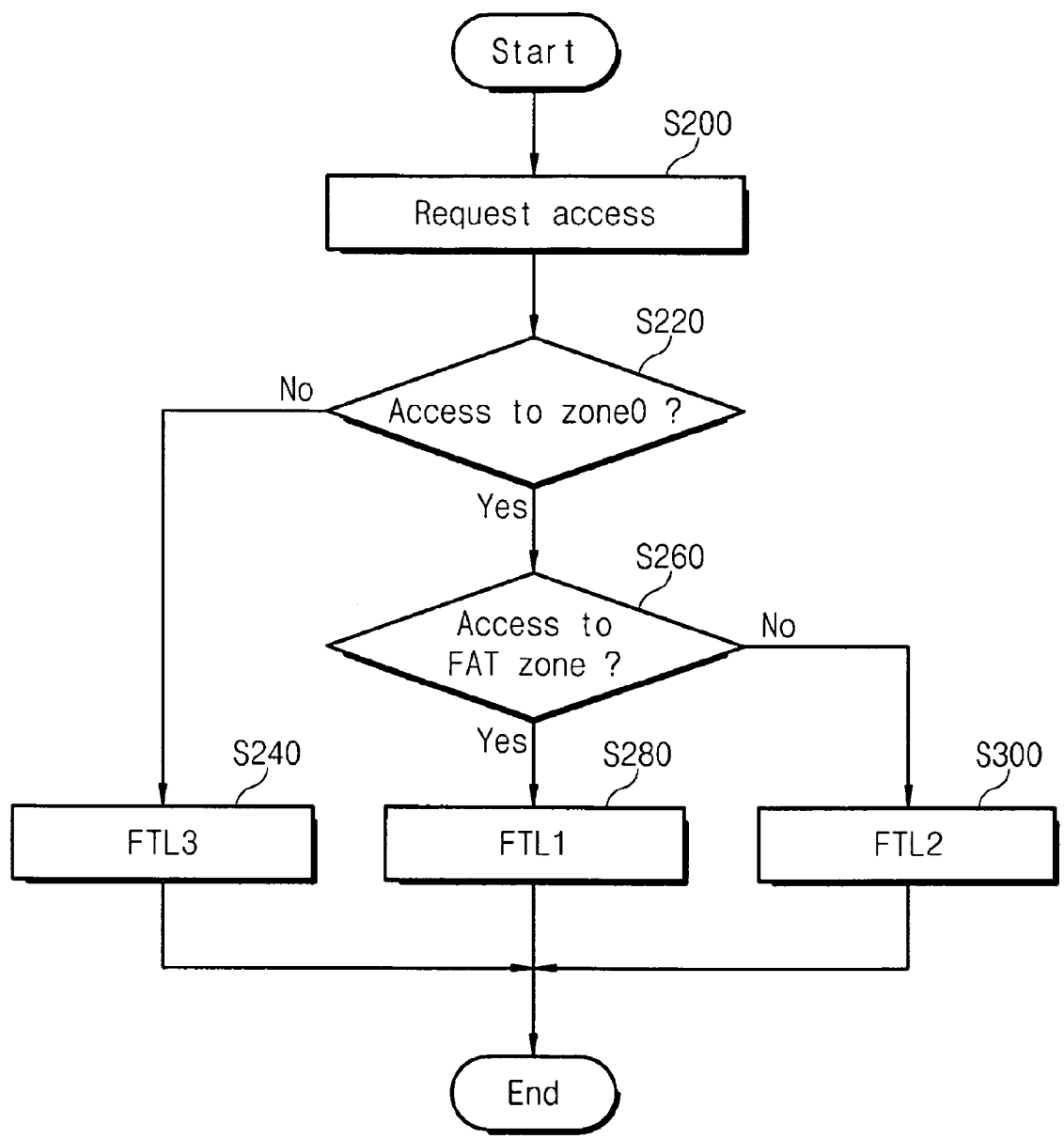
FIG. 10 is a flowchart describing a process of determining a flash translation layer according to the mapping policy of FIG. 9.

Referring to FIG. 10, which is a flowchart describing a process of managing mapping data of the flash memory in the flash memory system adopting the mapping policy of FIG. 9, first at step S200, an access to the flash memory 600 is requested from the host processor 200. At step S220, the control device 400 determines the pattern of the currently requested access. For the sake of convenience in description, it is assumed that the first flash translation layer FTL1 uses the page mapping scheme, the second flash translation layer FTL2 uses the log/block mapping scheme, and the third flash translation layer FTL3 uses the block/log mapping scheme. Also, it is assumed that the control device 400 uses any one of the aforementioned determination methods, for example, a method of determining the access pattern based on logical address information included in the data to be written. Therefore, the control device 400 extracts the logical address information from the data inputted when an access is requested and determines whether the extracted logical address information is for designating the FAT data. In short, it is determined whether the currently requested access is an access to the first zone Zone0. If the currently requested access is not an access to the first zone Zone0, at step S240, the control device 400 manages the mapping of data of the flash memory 600 based on the third flash translation layer FTL3 stored in the memory unit 440. If the currently requested access is an access to the first zone Zone0, at step S260, the control device 400 determines whether the currently requested access is an access to the FAT region. If the currently requested access is an access to the FAT region, at step S280, the control device 400 manages the mapping of data of a first region of the first zone Zone0 based on the first flash translation layer FTL1 stored in the memory 440. If the currently requested access is not an access to the FAT region, at step S300, the control device 400 manages the mapping data of a second region of the first zone Zone0 based on the second flash translation layer FTL2 stored in the memory 440. The aforementioned processes S220 to S300 are repeated whenever an access is requested by the host processor 200.

According to the mapping policy, after consecutive picture data, the FAT region is not brought and the FAT data is updated in an independent space. Therefore, the discontinuity caused by the FAT region disappears and the frequency number of merging operation, which is also caused by the FAT region, is reduced remarkably. In particular, since only the most recent data is valid in the FAT, the number of valid pages to be copied during merging operation when the page mapping scheme is applied can be reduced into a number as small as the FAT region. This signifies that not only the frequency number of merging but also the time consumed for the merging operation can be reduced. Therefore, the performance of the entire system can be prevented from degrading by managing the FAT table based on the page mapping scheme.

Although the mapping policy of the present invention is described by taking an example of a memory card, it is obvious to those skilled in the art that the present invention is not limited to it. As well known, a system using a flash memory should use a flash translation layer necessarily. Therefore, the mapping policy of the present invention can be applied to the system. For example, the mapping policy of the present invention can be applied to a semiconductor solid-state disk controller for controlling a flash memory as storage. Although memory regions to which different flash translation layers are applied are divided based on the quantity of data, it is obvious to those skilled in the art that the memory regions can be divided based on different conditions. As described above, the technology of the present invention can prevent the performance of the entire system from degrading by selecting an appropriate flash translation layer among a plurality of flash translation layers based on an access pattern and managing mapping data.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flash memory control device, comprising:
   a memory unit configured to store a plurality of flash translation layers; and
   a control unit electrically coupled to said memory unit, said control unit configured to select one of the plurality of flash translation layers in response to determining a pattern of flash memory access associated with at least one applied memory access request and further configured to manage mapping of data to a flash memory device based on the selected one of the plurality of flash translation layers;
   wherein the plurality of flash translation layers map logical addresses and physical addresses differently according to different quantities of data being written into the flash memory device.

2. The flash memory control device of claim 1, wherein said control unit is further configured to extract logical address information from data applied to the flash memory control device with the at least one applied memory access request; wherein determining a pattern of flash memory access includes determining a pattern of flash memory access from the extracted logical address information; and wherein said control unit is configured to select a page mapping scheme in response to a single write request and a log mapping scheme in response to a sequential write request.

3. The flash memory control device of claim 1, wherein said control unit is further configured to accumulate access information from the at least one applied memory access request; and wherein determining a pattern of flash memory access includes determining a pattern of flash memory access using the accumulated access information.

4. The flash memory control device of claim 1, wherein each of the plurality of flash translation layers maps to a respective memory region within the flash memory device.

5. The flash memory control device of claim 1, wherein a first one of the plurality of flash translation layers corresponds to a page mapping scheme and a second one of the plurality of flash translation layers corresponds to mapping scheme selected from a group consisting of a log mapping scheme and a block mapping scheme.

6. The flash memory control device of claim 1, wherein said memory unit and said control unit are packaged within a flash memory card.

7. The flash memory control device of claim 1, wherein said memory unit and said control unit are packaged within a solid state disk controller.

8. The flash memory control device of claim 1, wherein said memory unit and said control unit are contained within an xD card.

9. The flash memory control device of claim 1, wherein relatively small quantities of data being written into the flash memory device include a file allocation table (FAT).

10. A flash memory control device, comprising:
a memory unit configured to store a plurality of flash translation layers; and
a control unit electrically coupled to said memory unit, said control unit configured to select one of the plurality of flash translation layers in response to extracting logical address information from data received by the flash memory control device and determining a pattern of flash memory access from the extracted logical address information;
wherein the plurality of flash translation layers map logical addresses and physical addresses differently according to different quantities of data being written into a flash memory device.

11. The flash memory control device of claim 10, wherein said control unit is further configured to manage mapping of data to the flash memory device based on the selected one of the plurality of flash translation layers.

12. An apparatus for controlling a flash memory, comprising:
a memory for storing a plurality of flash translation layers; and
a control block for, when an access is requested from outside, determining a pattern of the access, selecting one of the flash translation layers stored in the memory based on the determination result, and managing mapping data of the flash memory based on the selected flash translation layer;
wherein the plurality of flash translation layers map logical addresses and physical addresses differently according to different quantities of data being written into the flash memory.

13. The apparatus of claim 12, wherein the control block extracts logical address information from data inputted when the access is requested and determining the pattern of access based on the extracted logical address information.

14. The apparatus of claim 12, wherein the control block accumulates the access pattern information when the access, is requested, and determines the access pattern of the flash memory based on the accumulated access pattern information.

15. The apparatus of claim 12, wherein the control block determines the access pattern based on access information inputted from outside when the access is requested.

16. The apparatus of claim 12, wherein the flash memory includes a plurality of memory regions corresponding to the flash translation layers individually, and mapping data of each memory region are managed by a corresponding flash translation layer.

17. The apparatus of claim 12, wherein the flash memory is divided into at least a first memory region and a second memory region, and the memory includes a first flash translation layer for managing mapping data of the first memory region and a second flash translation layer for managing mapping data of the second memory region.

18. The apparatus of claim 17, wherein the first flash translation layer uses a page mapping scheme, and the second flash translation layer uses any one of log and block mapping schemes.

19. The apparatus of claim 12, wherein the apparatus for controlling the flash memory is included in a memory card.

20. The apparatus of claim 12, wherein the apparatus for controlling the flash memory is included in a semiconductor solid state disk controller.

21. A flash memory system, comprising:
a host;
a flash memory including a plurality of memory regions; and
a control device storing at least two flash translation layers;
wherein when an access is requested from the host, the control device determines a pattern of the access based on access information provided from the host, selects one of the flash translation layers based on the determined access pattern, and manages mapping data for the memory regions in the flash memory based on the selected flash translation layer;
wherein the at least two flash translation layers map logical addresses and physical addresses differently according to different quantities of data being written into the flash memory.

22. The flash memory system of claim 21, wherein the control device includes:
a memory for storing the flash translation layers; and
a control block for determining the pattern of the access based on the access information, selecting one of the flash translation layers based on the determined access pattern, and managing mapping data for the memory regions of the flash memory based on the selected flash translation layer.

23. The flash memory system of claim 22, wherein the control block extracts logical address information from data inputted when the access is requested and determining the pattern of access based on the extracted logical address information.

24. The flash memory system of claim 22, wherein the control block accumulates the access pattern information when the access is requested, and determines the access pattern of the flash memory based on the accumulated access pattern information.

25. The flash memory system of claim 22, wherein the control block determines the access pattern based on access information inputted from outside when the access is requested.

26. The flash memory system of claim 22, wherein, among the flash translation layers, the first flash translation layer uses a page mapping scheme, and the second flash translation layer uses any one of log and block mapping schemes.

27. The flash memory system of claim 26, wherein among the memory regions, mapping data of some memory regions are managed by the first flash translation layer and mapping data of the other regions are managed by the second flash translation layer.

28. The flash memory system of claim 22, wherein the flash memory and the control device form a memory card.

29. The flash memory system of claim 22, wherein the flash memory system is a semiconductor solid state disk controller.

30. A method for managing mapping data of a flash memory, comprising:

when an access to the flash memory is requested, determining a pattern of the access;
selecting one of multiple flash translation layers based on the determined access pattern; and
managing mapping data of the flash memory based on the selected flash translation layer;
wherein the multiple flash translation layers map logical addresses and physical addresses differently according to different quantities of data being written into the flash memory.

31. The method of claim 30, wherein the determining the pattern of the access includes:
extracting logical address information from data inputted when the access is requested; and
determining the pattern of the requested access based on the extracted logical address information.

32. The method of claim 30, wherein the determining the pattern of the access includes:
accumulating access pattern information when the access is requested; and
determining the pattern of the access to the flash memory based on the accumulated access pattern information.

33. The method of claim 30, wherein the access pattern is determined based on access information inputted from outside when the access is requested.

34. A flash memory control device, comprising:
a memory unit configured to store a plurality of flash translation layers; and
a control unit electrically coupled to said memory unit, said control unit configured to select one of the plurality of flash translation layers in response to determining a pattern of flash memory access associated with at least one applied memory access request and further configured to manage mapping of data to a flash memory device based on the selected one of the plurality of flash translation layers;
wherein the plurality of flash translation layers map logical addresses and physical addresses in different manners in terms of a mapping unit or a position of the physical addresses.

* * * * *